United States Patent

Kakuishi et al.

Patent Number: 5,888,637
Date of Patent: Mar. 30, 1999

[54] MAGNETIC RECORDING MEDIUM TAPE FAVORABLY EMPLOYABLE FOR COMPUTER DATA STORAGE

[75] Inventors: Yutaka Kakuishi; Satoru Hayakawa; Toru Nakao, all of Kanagawa, Japan

[73] Assignee: Fuji Photo Film Co., Ltd., Japan

[21] Appl. No.: 869,314

[22] Filed: Jun. 5, 1997

[30] Foreign Application Priority Data

Jun. 5, 1996 [JP] Japan ................................ 8-165377

[51] Int. Cl.⁶ ........................................ G11B 5/68
[52] U.S. Cl. ...................... 428/216; 428/323; 428/329; 428/336; 428/694 BS; 428/694 BB; 428/694 BR; 428/694 BA; 428/900
[58] Field of Search .................... 428/216, 323, 428/336, 329, 694 BS, 694 BB, 694 BR, 900, 694 BA

[56] References Cited

U.S. PATENT DOCUMENTS

| | | | |
|---|---|---|---|
| 5,629,075 | 5/1997 | Ishikawa et al. ................. | 428/216 |
| 5,698,286 | 12/1997 | Ikarashi et al. .................. | 428/65.3 |
| 5,728,454 | 3/1998 | Inaba et al. ..................... | 428/212 |
| 5,792,548 | 8/1998 | Kuwajima et al. ............... | 428/215 |

*Primary Examiner*—Stevan A. Resan
*Attorney, Agent, or Firm*—Brinks Hofer Gilson & Lione

[57] ABSTRACT

A magnetic recording tape favorably employable for computer data storage has a flexible polymer web, a magnetic recording layer arranged on one surface side of the web via a non-magnetic undercoating layer, and a back-coating layer arranged on another surface side of the web, wherein the magnetic recording tape has a thickness of not more than 8 $\mu$m; the non-magnetic undercoating layer has a thickness of 0.5 to 2.0 $\mu$m; the magnetic recording layer has a thickness of 0.5 to 1.0 $\mu$m; the polymer web has a Young's modules of not lower than 700 kg/mm² in its width direction; and the back-coating layer is made of a binder polymer, a carbon black and an inorganic material powder.

25 Claims, 1 Drawing Sheet

SOLITARY REGENERATED REVERSE WAVEFORM

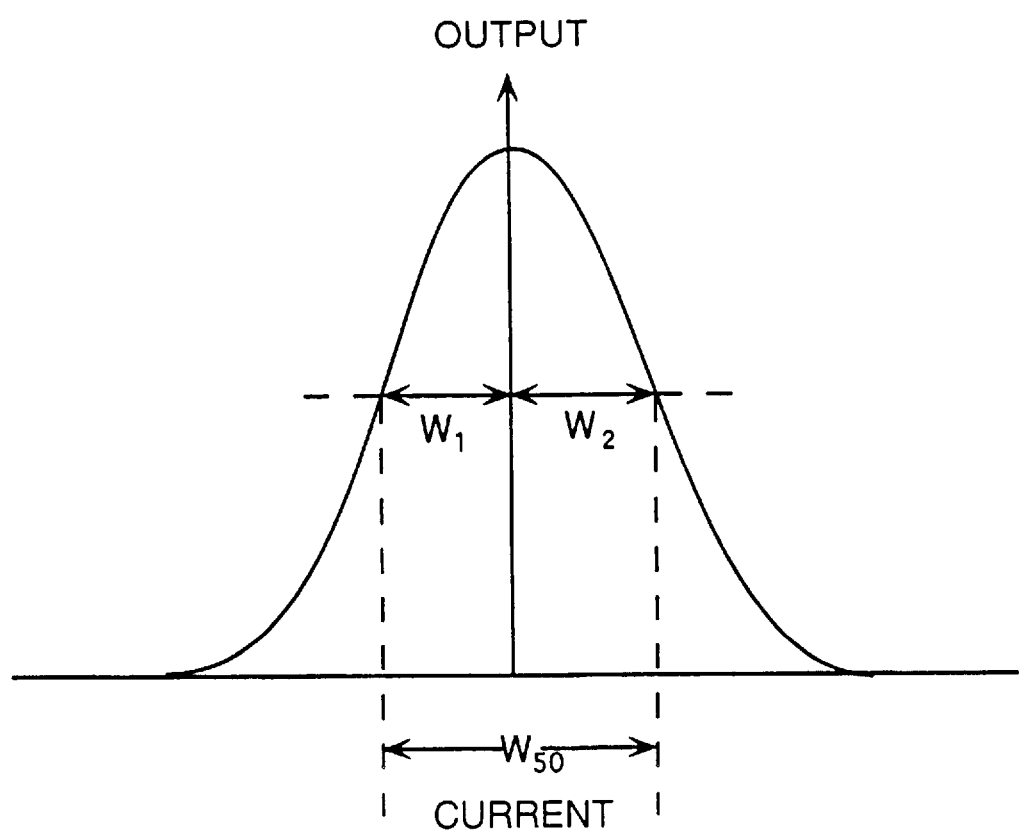
SOLITARY REGENERATED REVERSE WAVEFORM

MAGNETIC RECORDING MEDIUM TAPE FAVORABLY EMPLOYABLE FOR COMPUTER DATA STORAGE

FIELD OF THE INVENTION

The present invention relates to a magnetic recording tape favorably employable for computer data storage.

BACKGROUND OF THE INVENTION

Recently, small-sized computers such as mini computers and personal computers have been widely employed in business. For this reason, it has become very important to store computer data with high security, and therefore magnetic recording tapes which are named "back-up tapes" have been employed for that purpose. The magnetic recording tapes for computer storage are further required to have great storage capacity so as to store a great amount of computer data in the form of digital data with high security and high reliability.

The back-up tape comprises a flexible plastic web (i.e., support) and a magnetic recording layer provided thereon, in the same manner as in the conventional magnetic recording tapes such as an audio tape and a video tape. The magnetic recording layer comprises a ferromagnetic powder and a binder.

The magnetic recording tape is repeatedly run in contact with a magnetic head. The back-up tape sometimes is more repeatedly run than the conventional audio or video tape.

The back-up tape is encased in a cassette, in the same manner as for an audio tape. The most easy way to increase the data storage capacity of a magnetic recording tape is to increase the length of the tape. However, the size of the compact cassette for encasing the back-up tape cannot be freely enlarged. Therefore, if the length of the back-tape is desired to increase, the thickness of the tape should be decreased. For this reason, the most back-up tape has a decreased thickness, as compared with the conventional audio tape.

The increased data storage capacity of a magnetic recording tape also can be attained by decreasing the size of the ferromagnetic powder and decreasing the thickness of the magnetic recording layer. The back-up tape also should have improved electromagnetic characteristics, and the improvement of electromagnetic characteristics can be accomplished by giving to the magnetic recording layer high smoothness.

The decreased tape thickness and increased smoothness of the surface of the magnetic recording layer sometimes cause tape running troubles such as wrong tape winding. For the reason, a back-coating layer is generally provided on the reverse side of the back-up tape, that is, on the surface of the support opposite to the surface on which the magnetic recording layer is provided. The back-coating layer naturally should be thin so as not to extremely increase the tape thickness.

In the digital data storage systems employed for recording the computer data, there are known a number of standard storage systems such as D8 system, DDS1 system, and DDS2 system, which utilize, as a standard magnetic recording tape, a magnetic recording tape in which a magnetic recording layer is directly formed on a support, that is known as a mono-layer type tape. In these systems, specifically selected equalizers are installed for compensating deterioration of frequency characteristics of the regenerated signals in the high frequency range as well as in the low frequency range. In the digital data storage system, the so called intersymbol interference sometimes occurs if a frequency characteristic of the regenerated signal deteriorates (in the process of recording and regeneration in the high and low frequency range), and gives an error in the regenerated signals. In order to compensate the troubles caused by the inter-symbol interference, the conventional computer data storage systems utilize the equalizer. Therefore, a magnetic recording tape for the conventional computer data storage systems should be designed to have appropriate characteristics in harmony with the characteristics of the equalizer installed in the conventional system.

The mono-layer type magnetic recording tape, that is, a magnetic recording tape in which a magnetic recording layer is directly formed on the support, has drawbacks in that it is difficult to give a high output and the running endurance is not enough.

U.S. Pat. No. 5,419,961 discloses a magnetic recording tape having a decreased thickness. For instance, it states a magnetic recording tape having a total thickness of 10 $\mu$m which has a back-coating layer of 0.5 $\mu$m, as well as a magnetic recording tape having a total thickness of 9.5 $\mu$m which has a back-coating layer of 0.5 $\mu$m. For obtaining a magnetic recording tape having improved anti-static property and running performance, the former magnetic recording tape has a back-coating layer containing a carbon black of a relatively small particle size, and the latter magnetic recording tape has a back-coating layer containing a carbon black of a relatively large particle size as well as a carbon black of a relatively small particle size. It describes further that a preferred support web may comprise a polyester, especially polyethylenenaphthalate (PEN).

From the viewpoint of recent development of the back-up tape, namely, a magnetic recording tape for computer data storage, however, the magnetic recording tape disclosed in the above-mentioned United States Patent is not enough in its performance. Mere decrease of the tape thickness cannot produce a back-up tape having satisfactory electromagnetic and running characteristics.

The present invention has an object to provide a magnetic recording tape which is appropriately employable in the conventional computer data storage systems and shows satisfactory electromagnetic characteristics and running endurance.

SUMMARY OF THE INVENTION

The present invention resides in a magnetic recording tape comprising a flexible support web, a magnetic recording layer which comprises a ferromagnetic powder and a binder and is arranged on one surface side of the support web via a non-magnetic undercoating layer comprising a binder and a non-magnetic powder, and a back-coating layer which is arranged on another surface side of the support web, wherein the magnetic recording tape has a thickness of not more than 8 $\mu$m;

the non-magnetic undercoating layer has a thickness of 0.5 to 2.0 $\mu$m;

the magnetic recording layer has a thickness of 0.5 to 1.0 $\mu$m;

the flexible support web has a Young's modules of not lower than 700 kg/mm$^2$ in its width direction; and the back-coating layer comprises a binder polymer, a carbon black and an inorganic material powder.

The preferred embodiments of the invention are as follows:

1) The above-mentioned magnetic recording tape wherein the magnetic recording layer has been formed on the non-magnetic undercoating layer under the condition that the non-magnetic undercoating layer is wet.

2) The above-mentioned magnetic recording tape of claim 1, wherein the carbon black comprises a carbon black I having a mean particle size of 10 to 20 m$\mu$ and a carbon black II having a mean particle size of 230 to 300 m$\mu$.

3) The above-mentioned magnetic recording tape wherein the inorganic material powder comprises an inorganic powder I having a mean particle size of 30 to 50 m$\mu$ and Mohs' scale of hardness of 3 to 4.5 and an inorganic material powder II having a mean particle size of 80 to 250 m$\mu$ and Mohs' scale of hardness of 5 to 9.

4) The above-mentioned magnetic recording tape wherein the inorganic material powder comprises a calcium carbonate powder having a mean particle size of 30 to 50 m$\mu$ and an inorganic material powder having a mean particle size of 80 to 250 m$\mu$ and Mohs' scale of hardness of 5 to 9.

5) The above-mentioned magnetic recording tape wherein the inorganic material powder comprises an inorganic material powder having a mean particle size of 30 to 50 m$\mu$ and Mohs' scale of hardness of 3 to 4.5 and a powder of $\alpha$-iron oxide or $\alpha$-alumina having a mean particle size of 80 to 250 m$\mu$.

6) The above-mentioned magnetic recording tape wherein the flexible support web has a thickness of 1.0 to 6.5 $\mu$m.

7) The above-mentioned magnetic recording tape wherein the magnetic recording layer has a surface roughness of 2 to 5 nm, said surface roughness being determined by 3D-MIRAU method.

8) The above-mentioned magnetic recording tape wherein the magnetic recording tape has a thickness of 3.0 to 7.8 $\mu$m.

9) The above-mentioned magnetic recording tape wherein the flexible support web has a Young's modules of 730 to 1,700 kg/mm$^2$ in its width direction.

BRIEF DESCRIPTION OF DRAWING

FIGURE illustrates a regenerated waveform (i.e., isolated or solitary regenerated reverse waveform) obtained in the magnetic recording system.

DETAILED DESCRIPTION OF THE INVENTION

The magnetic recording tape of the invention is further described below.

The magnetic recording tape of the invention comprises a flexible support web, a combination of a non-magnetic undercoating layer and a magnetic recording layer provided on one side of the support web in this order, and a backcoating layer provided on another side of the support web.

The magnetic recording tape of the invention should have a thickness of not more than 8 $\mu$m (preferably 3 to 7.8 $\mu$m, more preferably 4.0 to 7.5 $\mu$m) and shows a large Young's modules such as 700 kg/mm$^2$ or more (preferably 730 to 1,700 kg/mm$^2$) in its width direction.

Accordingly, the flexible support web (which is non-magnetic and serves as a support) may comprise a high-molecular weight polymer which is employed for the formation of the conventional magnetic recording tape. Examples of the employable high-molecular weight polymer include polyesters (e.g., polyethylene terephthalate, polyethylene naphthalate, mixture of polyethylene terephthalate and polyethylene naphthalate, a copolymer of ethylene terephthalate and ethylene naphthalate), polyolefins (e.g., polypropylene), cellulose derivatives (e.g., cellulose diacetate, and cellulose triacetate), polycarbonate, polyamide such as aromatic polyamide, polyimide such as aromatic polyimide.

The flexible support web has a large Young's modules such as 700 kg/mm$^2$ or more (preferably 730 to 1,700 kg/mm$^2$) in its width direction.

The non-magnetic support polymer web generally has a thickness of 1.0 to 6.5 $\mu$m, preferably 3.0 to 6.0 $\mu$m, more preferably 4.0 to 5.5 $\mu$m.

The non-magnetic undercoating layer arranged on the support comprises a non-magnetic powder and a binder polymer and is essentially non-magnetic. The non-magnetic undercoating layer may contain a small amount of a magnetic powder under the condition that the magnetic property of the non-magnetic undercoating layer does not adversely affect the magnetic property of the magnetic recording layer arranged thereon.

Examples of the non-magnetic powder for the incorporation into the non-magnetic undercoating layer include non-magnetic inorganic material powders and carbon black.

The non-magnetic inorganic material powder preferably has Mohs' scale of hardness of 5 or more, more preferably 6 or more and can be $\alpha$-alumina, $\beta$-alumina, $\gamma$-alumina, carbon silicate, chromium oxide, cerium oxide, $\alpha$-iron oxide, corundum, silicon nitride, titanium carbide, titanium dioxide, silicon dioxide, boron nitride, zinc oxide, calcium carbonate, calcium sulfate, or barium sulfate. The non-magnetic inorganic material powder can be used singly or in combination. Preferred are titanium dioxide, $\alpha$-alumina, $\alpha$-iron oxide, and chromium oxide, and the most preferred are titanium dioxide and $\alpha$-iron oxide.

The non-magnetic inorganic material powder preferably has a particle size (namely, mean particle size) of 0.01 to 1.0 $\mu$m, more preferably 0.01 to 0.5 $\mu$m, specifically preferably 0.02 to 0.1 $\mu$m.

The non-magnetic undercoating layer preferably contains the non-magnetic inorganic material powder and carbon black in combination.

The carbon black imparts to the non-magnetic undercoating layer appropriate electroconductivity so as to keep the undercoating layer from static electricity and further improves smoothness of the surface of the magnetic recording layer arranged thereon. Examples of carbon black for incorporation into the non-magnetic undercoating layer are those described hereinbefore for the preparation of the magnetic recording layer. The particle size of carbon black for the non-magnetic undercoating layer preferably is not larger than 35 m$\mu$, more preferably is in the range of 10 to 35 m$\mu$.

The carbon black can be incorporated into the non-magnetic undercoating layer in an amount of 3 to 20 weight parts, preferably 4 to 18 weight parts, more preferably 5 to 15 weight parts, based on 100 weight parts of the non-magnetic inorganic material powder.

The non-magnetic undercoating layer may further contain a lubricant such as a fatty acid or a fatty acid ester. Examples of the lubricant employable for the incorporation into the non-magnetic undercoating layer are those stated hereinbefore for the magnetic recording layer. The lubricant can be employed in an amount of 0.2 to 20 weight parts based on 100 weight parts of the non-magnetic powder in the non-magnetic undercoating layer. The binder polymer such as that described hereinafter for the magnetic recording layer can be employed in an amount of 5 to 50 weight parts, preferably 10 to 30 weight parts, based on 100 weight parts of the non-magnetic powder in the undercoating layer. The binder polymer preferably incorporated into the non-magnetic undercoating layer is a mixture of 5 to 70 wt. % of a vinyl chloride resin, 2 to 50 wt. % of a polyurethane resin (an ordinary polyurethane resin, or the above-mentioned polyurethane or polyurethane-polyurea resin having a high glass transition temperature) and 2 to 50 wt.% of a polyisocyanate.

The non-magnetic undercoating layer has a thickness of 0.5 to 2.0 μm, preferably 0.8 to 1.8 μm.

On the non-magnetic undercoating layer is provided a magnetic recording layer.

In the magnetic recording tape, the magnetic recording layer has a thickness of about 0.5 to 1.0 μm, preferably 0.5 to 0.8 μm. The ratio of thickness between the magnetic recording layer and the non-magnetic undercoating layer preferably is in the range of 1:0.8 to 1:6, more preferably 1:1 to 1:5, most preferably 1:1.2 to 1:4.

The magnetic recording layer provided on the non-magnetic undercoating layer comprises a ferromagnetic powder and a binder polymer. The magnetic recording layer may further comprise a lubricant, an electroconductive carbon black, and an abrasive.

The ferromagnetic powder may comprise $\gamma$—$Fe_2O_3$, $Fe_3O_4$, $FeO_x$ (x=1.33–1.5), $CrO_2$, Co-containing $\gamma$—$Fe_2$, Co-containing $FeO_x$ (x=1.33–1.5), ferromagnetic metal powders, and/or hexagonal ferrite plate powders. Preferred ferromagnetic powders are ferromagnetic metal powders and hexagonal ferrite plate powders. The ferromagnetic metal powders are most preferred.

The ferromagnetic metal powder preferably has a specific surface area of 30 to 70 $m^2/g$ and a crystallite size of 50 to 300 angstroms (which is determined by X ray diffraction).

The ferromagnetic metal powder necessarily contains Fe, and preferably comprises Fe, Fe-Co, Fe-Ni, Fe-Zn-Ni, or Fe-Ni-Co. The ferromagnetic metal powder preferably has a saturation magnetization ($\sigma s$: saturation magnetic flux density) of not less than 110 emu/g, more preferably of 120 to 170 emu/g. The coercive force (Hc) preferably is in the range of 1,900 to 2,600 Oe, more preferably in the range of 2,000 to 2,400 Oe. The squareness ratio ($\sigma r/\sigma s$) is preferably not lower than 0.78, preferably in the range of 0.78 to 0.95, more preferably in the range of 0.80 to 0.98. In the squareness ratio, "$\sigma s$" stands for "saturation magnetic flux density, and "$\sigma r$" stands for "residual magnetic flux density". The length of longitudinal axis of the metal powder (i.e., mean particle size) preferably is not longer than 0.5 μm, more preferably in the range of 0.01 to 0.3 μm, and the axial ratio (i.e., aspect ratio: length of longitudinal axis/length of width axis) preferably is in the range of 5 to 20, more preferably 5 to 15. The metal powder may further contain one or more non-metallic elements such as B, C, Al, Si and P, or their salts or oxides. The surface of the metal powder may be coated with an oxide film.

The hexagonal ferrite plate powder preferably has a specific surface area of 25 to 65 $m^2/g$, a plate ratio (plate diameter/plate thickness) of 2 to 15, and a plate diameter (i.e., plate size) of 0.02 to 1.0.

The hexagonal ferrite plate powder has an axis of easy magnetization in the direction vertical to the plate surface. The hexagonal ferrite plate preferably comprises barium ferrite, strontium ferrite, lead ferrite, calcium ferrite, or its cobalt-containing ferrite. Most preferred are cobalt-containing barium ferrite and cobalt-containing strontium ferrite. The ferrite plate powder may further contain one or more other elements such as In, Zn, Ge, Nb or V.

The ferromagnetic powder preferably has a water content in the range of 0.01 to 2 wt. % and shows pH in the range of 4 to 12, more preferably 5 to 10. The ferromagnetic powder may be coated on its surface with Al, Si, P or their oxide in an amount of 0.1 to 10 wt. % (based on the amount of the ferromagnetic powder). The ferromagnetic powder also may contain one or more inorganic ions of Na, Ca, Ni and Si in amounts of not more than 5,000 ppm.

The binder polymer may be a thermoplastic, thermosetting or reactive resin, or one of their mixtures.

Examples of the thermoplastic resins include homopolymers and copolymers comprising one or more monomer units derived from vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal or vinyl ether. Examples of the copolymers include vinyl chloride-vinyl acetate copolymer, vinyl chloride-vinylidene chloride copolymer, vinyl chloride-acrylonitrile copolymer, acrylate-acrylonitrile copolymer, acrylatevinylidene chloride copolymer, acrylate-styrene copolymer, methacrylate-acrylonitrile copolymer, methacrylatevinylidene chloride copolymer, methacrylate-styrene co-polymer, vinylidene chloride-acrylonitrile copolymer, butadiene-acrylonitrile copolymer, styrene-butadiene copolymer, and chlorovinyl ether-acrylate copolymer.

A polyamide resin, cellulosic resins such as cellulose acetate butylate, cellulose diacetate, cellulose propionate and nitrocellulose, poly(vinyl fluoride), a polyester resin, a polyurethane resin, various rubber resins are also employable.

The thermosetting resin and reactive resin may be a phenol resin, an epoxy resin, a thermosetting polyurethane resin, a urea resin, a melamine resin, an alkyd resin, an acrylic reactive resin, a formaldehyde resin, a silicone resin, an epoxy-polyamide resin, a mixture of a polyester resin and a polyisocyanate prepolymer, a mixture of polyester polyol and polyisocyanate, and a mixture of polyurethane and polyisocyanate. The polyurethane resin may be a known polyester polyurethane, polyether polyurethane, polyether polyester polyurethane, polycarbonate polyurethane, polyester polycarbonate polyurethane, or a polycaprolactone polyurethane. The polyisocyanate may be an isocyanate such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate or triphenylmethane triisocyanate, a product of the isocyanate and a polyalcohol, or a polyisocyanate produced by condensation of these isocyanates.

Preferred binder polymers are combinations of the polyurethane resin and other resins such as the vinyl chloride resin, vinyl acetate-vinyl chloride copolymer, vinyl chloride-vinyl acetate-vinyl alcohol copolymer, vinyl chloride-vinyl acetate-maleic anhydride copolymer, and nitrocellulose. The polyisocyanate can be incorporated into the polymer mixtures.

The binder polymer preferably has a polar group such as —COOM, —$SO_3M$, —$OSO_3M$, —P=O(OM)$_2$, —O—P=O(OM)$_2$, wherein M is hydrogen or an alkali metal, —OH, —$NR_2$, —$N^+R_3$, wherein R is a hydrocarbon group, epoxy group, —SH, and —CN, if desired, so as to impart to the magnetic recording layer improved magnetic powder dispersion and improved endurance. The polar group can be incorporated to the binder polymer by copolymerization or addition reaction, and is preferably contained in the binder polymer in an amount of $10^{-1}$ to $10^{-8}$ mol/g, more preferably $10^{-2}$ to $10^{-6}$ mol/g.

The binder polymer is generally incorporated in the magnetic recording layer in an amount of 5 to 50 weight parts, preferably 10 to 30 weight parts, based on 100 weight parts of the ferromagnetic powder. The binder polymer preferably is a mixture of 5 to 70 wt. % of a vinyl chloride resin, 2 to 50 wt. % of a polyurethane resin (an ordinary polyurethane resin, or the above-mentioned polyurethane or polyurethane-polyurea resin having a high glass transition temperature), and 2 to 50 wt. % of a polyisocyanate.

The lubricant can be incorporated into the magnetic recording layer so that it can come out onto the surface of the recording layer. The lubricant can release friction between the surface of the recording layer and a magnetic head and maintain smooth contact between the surface of the recording layer and the magnetic head. Typically, the lubricant is a fatty acid or its ester.

Examples of the fatty acids employable as lubricant include acetic acid, propionic acid, 2-ethylhexanoic acid, lauric acid, myristic acid, palmitic acid, stearic acid, behenic acid, arakinic acid, oleic acid, elaidic acid, linolic acid, linoleic acid, palmitoleic acid, and other aliphatic fatty acid. The fatty acids can be employed singly or in combination.

Examples of the fatty acid esters employable as lubricant include butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, oleyl oleate, butoxyethyl stearate, 2-butoxy-1-propyl stearate, dipropylene glycol monobutyl ether acylated with stearic acid, diethylene glycol dipalmitate, hexamethylene diol acylated with myristic acid, and glycerol oleate. The fatty acid esters can be employed singly or in combination. The fatty acid and fatty acid ester can be employed in combination.

The lubricant can be generally incorporated into the magnetic recording layer in an amount of 0.2 to 20 weight parts, preferably 0.5 to 10 weight parts, based on 100 weight parts of the ferromagnetic powder.

The carbon black can be incorporated into the magnetic recording layer so that the recording layer can have smooth surface. The carbon black preferably has a mean particle size (i.e., diameter) of 5 to 350 m$\mu$ (more preferably 10 to 300 m$\mu$), and a specific surface area of 5 to 500 n/g (more preferably 50 to 300 m$^2$/g). Further, the carbon black shows a DBP (dibutyl phthalate) oil absorption in the range of 10 to 1,000 mL/100 g (more preferably 50 to 300 mL/100 g), pH of 2 to 10, a water content of 0.1 to 10%, and a tap density of 0.1 to 1 g/cc.

The carbon black can be those produced by various processes. For instance, furnace black, thermal black, acetylene black, channel black, and lamp black can be employed. Examples of commercially available carbon blacks are BLACK PEARLS 2000, 1300, 1000, 900, 800, 700, VOLCAN X-72 (available from Cabot Corporation), #35, #50, #55, #60 and #80 (available from Asahi Carbon Co., Ltd.), #3950B, #3750B, #3250B, #2400B, #2300B, #1000, #900, #40, #30, and #10B (available from Mitsubishi Chemicals Co., Ltd.), CONDUCTEX SC, RAVEN 150, 50, 40, 15 (available from Columbia Carbon Corp.), Ketchen Black EC, Ketchen Black ECDJ-500, and Ketchen Black ECDJ-600 (available from Lion-Akzo Co., Ltd.).

The carbon black can be generally incorporated into the magnetic recording layer in an amount of 0.1 to 30 weight parts, preferably 0.2 to 15 weight parts, based on 100 weight parts of the ferromagnetic powder.

The abrasive can be fused alumina, silicone carbide, chromium oxide ($Cr_2O_3$), corundum, synthesized corundum, diamond, synthesized diamond, garnet, and emery (main ingredients: corundum and ferrite). The abrasive generally has a Mohs' scale of hardness of not less than 5, preferably not less than 6, and preferably has a mean particle size (i.e., diameter) of 0.05 to 1 $\mu$m, more preferably 0.2 to 0.8 $\mu$m.

The abrasive can be generally incorporated into the magnetic recording layer in an amount of 3 to 25 weight parts, preferably 3 to 20 weight parts, based on 100 weight parts of the ferromagnetic powder.

The magnetic recording tape of the invention comprises a back-coating layer which generally has a thickness in the range of 0.2 to 1 $\mu$m, preferably 0.2 to 0.8 $\mu$m and preferably comprises a binder polymer, a carbon black, an inorganic material powder I having Mohs' scale of hardness of 3 to 4.5 and an inorganic material powder II having Mohs' scale of hardness of 5 to 9.

Examples of the binder polymers employable for the formation of the back-coating layer include those described for the binder polymer for the formation of the magnetic recording layer.

The carbon black employable for preparing the back-coating layer may be one of carbon blacks described for the preparation of the magnetic recording layer.

The carbon black preferably comprises a combination of two or more carbon black having different mean particle size (i.e., diameter). One carbon black preferably has a mean particle size of 10 to 20 m$\mu$ (carbon black I) and another carbon black preferably has a mean particle size of 230 to 300 m$\mu$ (carbon black II). The carbon black I having such a relatively small particle size imparts to the back-coating layer a low surface electric resistance and a low light transmittance. The low light transmittance may be advantageous for the use in such a magnetic recording device which works upon detection of light transmittance of running magnetic recording tape therein. Moreover, the carbon black I having such a relatively small particle size can reduce a friction coefficient efficiently when it is employed in combination with a liquid lubricant, because the carbon black I having the small particle size can well retain the liquid lubricant on its surface.

The carbon black II having a relatively large particle size can serve as solid lubricant and further form a protrusion of a small size on the surface of the back-coating layer. Such small size protrusion can reduce the total area of contact between the back-coating layer and the support members (for instance, guide poles) of the recording device. The reduced contact area results in reducing the friction coefficient between the back-coating layer and the support members.

Commercially available examples of the carbon black I having a relatively small particle size include RAVEN 2000B (particle size: 18 m$\mu$) and RAVEN 1500B (17 m$\mu$), both of which are available from Columbia Carbon Corp., BP 800 (17 m$\mu$) available from Cabot Corporation, PRINTEX 90 (14 m$\mu$), PRINTEX 95 (15 m$\mu$), PRINTEX 85 (16 m$\mu$) and PRINTEX 75 (17 m$\mu$), all of which are available from Degussa Corporation, and #3950 (16 m$\mu$) available from Mitsubishi Chemicals Co., Ltd.

Commercially available examples of the carbon black II having a relatively large particle size include THERMAL BLACK (270 mμ) available from Karnculb Corporation and RAVEN MTP (275 mμ) available from Columbia Carbon Corporation.

The ratio of carbon black I and carbon black II preferably is 98:2 to 75:25, by weight, more preferably 95:5 to 85:15. The total amount of carbon black(s) generally is in the range of 30 to 80 weight parts, preferably 45 to 65 weight parts, based on 100 weight parts of the binder polymer of the back-coating layer.

The combined use of the carbon black I having a relatively small particle size and the carbon black II having a relatively large particle size particularly in the specific ratio in the back-coating layer gives improved running performance as well as improved running durability (or endurance).

The back-coating layer of the magnetic recording tape according to the invention preferably contains at least two kinds of inorganic material powders, that is, an inorganic material powder I having Mohs' scale of hardness of 3 to 4.5 and an inorganic material powder II having Mohs' scale of hardness of 5 to 9. The inorganic material powder I preferably has a mean particle size of 30 to 50 mμ, while the inorganic material powder II preferably has a mean particle size of 80 to 250 mμ, more preferably 100 to 210 mμ.

Examples of the inorganic material powder I having a relatively low hardness include calcium sulfate, calcium carbonate, calcium silicate, barium sulfate, magnesium carbonate, zinc carbonate and zinc oxide. They are employed singly or in combination. Calcium carbonate is most preferred.

Examples of the inorganic material powder II having a relatively high hardness include α-iron oxide ($Fe_2O_3$), α-alumina ($Al_2O_3$), and chromium oxide ($Cr_2O_3$). They are employed singly or in combination. Most preferred are α-iron oxide and α-alumina.

In the back-coating layer, the inorganic material powder I preferably differs from the inorganic material powder II in the Mohs' scale of hardness by at least 2.0, more preferably at least 2.5, most preferably 3.0. The inorganic material powder I and the inorganic material powder II are preferably incorporated in the back-coating layer in amounts of 10 to 140 weight parts (more preferably 35 to 100 weight parts) and 3 to 30 weight parts (more preferably 3 to 20 weight parts), respectively, based on 100 weight parts of carbon black. The ratio of the inorganic material powder I and the inorganic material powder II preferably is 98:2 to 55:45, by weight, more preferably 95:5 to 60:40, most preferably 90:10 to 70:30.

The combined use of the inorganic material powder I and the inorganic material powder II in the back-coating layer provides to the magnetic recording tape prominently improved running performance and running durability.

The back-coating layer preferably further contains a lubricant such as a fatty acid or a fatty acid ester. Examples of the lubricants employable in the back-coating layer are those described for the incorporation into the magnetic recording layer. The lubricant is generally incorporated into the back-coating layer in an amount of 1 to 5 weight parts, based on 100 weight parts of the binder polymer.

The back-coating layer comprising a binder polymer, a carbon black and the combination of the inorganic material powder having a relatively low hardness and the inorganic material powder having a relatively high hardness preferably has a surface roughness (i.e, Ra value, center-line average roughness, cut-off at 0.08 mm) in the range of 3 to 60 nm, more preferably 3 to 10 nm, most preferably 3 to 8 nm. The adjustment of the surface roughness can be done by appropriately adjusting the calendaring conditions adopted in the calendaring processing which is applied onto the a laminate web comprising a support web and a back-coating layer. The adjustment of calendaring conditions can be done by choosing appropriate material and surface roughness of the calendar roller to be utilized and the calendaring pressure.

The satisfactorily adjusted surface roughness on the back-coating layer provides improved running performance. Further, the satisfactorily adjusted surface roughness on the back-coating layer can be duplicated on the surface of the magnetic recording layer when the recording tape is wound tightly, and the magnetic recording layer on which the well adjusted surface roughness is duplicated provides an appropriate friction coefficient between the recording layer and a magnetic head during the running of the recording tape so that excellent running performance can be imparted to the magnetic recording tape.

For the preparation of the magnetic recording tape, the magnetic recording layer is preferably placed on the non-inorganic undercoating layer by the known wet-on-wet process. The wet-on-wet process is performed by coating a magnetic recording layer-coating dispersion on the non-magnetic undercoating layer which is beforehand coated on the support web and is still wet, or by simultaneously coating a non-magnetic undercoating layer-coating dispersion and a magnetic recording layer-coating dispersion on the support web.

A variety of procedures for conducting the wet-on-wet process are described in the following U.S. and Japanese patent publications:

1) U.S. Pat. Nos. 4,681,062, No. 4,480,583 and No. 5,302,206 for gravure coating, roller coating, blade coating, and extrusion coating;
2) U.S. Pat. Nos. 4,854,262, No. 5,030,484 and No. 5,302,206 for simultaneous coating by means of a coating device comprising two slits in a single coating head; and
3) Japanese Patent Provisional Publication H2-174965 for simultaneous coating by means of an extrusion coating device equipped with a back-up roller.

The coating dispersions (i.e., coating mixtures) for preparing the magnetic recording layer, non-magnetic undercoating layer, and back-coating layer can further contain one or more additives such as a dispersant for uniformly dispersing the ferromagnetic powder or the non-magnetic powder in the coating dispersion, a plasticizer, a electroconductive powder other than carbon black, an anti-static agent, or a bactericide.

Examples of the dispersant include fatty acids having 12 to 18 carbon atoms such as caprylic acid, caproic acid, lauric acid, myristic acid, palmitic acid, stearic acid, behenic acid, oleic acid, elaidic acid, linolic acid, linoleic acid, and stearolic acid, their esters, their salt with alkali metals or alkaline earth metals, namely, metal soaps, fluorinated fatty acid esters, fatty acid amide, polyalkyleneoxide alkylphosphates, lecithin, trialkylpolyolefinoxy quaternary ammonium salts (alkyl of 1 to 5 carbon atoms, and olefin such as ethylene or propylene), sulfates, and copper phthalocyanine. These dispersants can be employed singly or in combination. In the above-illustrated formulas, each of $R^1$, $R^2$ and $R^3$ is a substituted or unsubstituted, straight chain or branched chain alkyl group having 1 to 22 carbon atoms such as methyl, ethyl, propyl, isopropyl, butyl, isobutyl, pentyl, hexyl, heptyl, octyl, nonyl, decyl, dodecyl, tetradecyl, octadecyl, 2-aminoethyl, or 2-butoxyethyl; a substituted or unsubstituted, straight chain or branched chain alkenyl group having 1 to 22 carbon atoms such as vinyl, propenyl, isopropenyl, butenyl, pentenyl, allyl, or oleyl; or a substituted or unsubstituted aryl group such as phenyl, naphthyl, anthryl, diphenyl, diphenylmethyl, p-ethylphenyl, p-nitrophenyl, tolyl, or xylyl. The aryl group can be indene or tetralin which has a ring The magnetic recording tape of the invention is favorably employable for storing computer data with high reliability and shows a high running performance.

The present invention is further described by the following examples and comparison examples. In these examples, "part(s)" means "part(s) by weight".

EXAMPLE 1

1) Coating solution for preparing non-magnetic undercoating layer

| | |
|---|---|
| Non-magnetic powder (titanium dioxide) (rutile type., $TiO_2$ content: higher than 90%, mean primary particle size: 0.035 μm, specific surface area (BET): 40 m²/g, pH: 7.0, DBP (dibutyl phthalate) absorption: 27–38 mL/100 g, Mohs' scale of hardness: 6.0. having a surface treated to form $Al_2O_3$) | 90 parts |
| Carbon black (available from Mitsubishi Carbon Co., Ltd., mean primary particle size: 16 mμ, DBP absorption: 80 mL/100 g, pH: 8.0 specific surface area (BET): 250 m²/g, volatile content: 1.5%) | 10 parts |
| Vinyl chloride copolymer (MR110, available from Nippon Zeon Co., Ltd.; polymerization degree: 350; content of —$SO_3Na$ group: $5 \times 10^{-6}$ mol/g; content of epoxy group: 3.5 wt. % in terms of monomer unit) | 12 parts |
| Polyurethane resin (—$SO_3Na$ group-containing polyester-polyurethane, content of —$SO_3Na$ group: $1 \times 10^{-4}$ mol/g, neopentylglycol/caprolactone polyol/MDI/0.9/2.6/1, weight ratio) | 5 parts |
| Polyisocyanate (Colonate L, available from Nippon Polyurethane Industries, Ltd.) | 3 parts |
| Butyl stearate | 1 part |
| Stearic acid | 2 parts |
| Oleic acid | 1 part |
| Methyl ethyl ketone | 150 parts |
| Cyclohexanone | 50 parts |
| Toluene | 40 parts |

All ingredients of the above-identified compositions were kneaded in a continuous kneader and dispersed in a sand mill. The resulting dispersion was mixed with 2.5 parts of polyisocyanate (Colonate L) and 40 parts of butyl acetate. The mixture was passed through a filter having a mean pore size of 1 μm, to give a coating solution for preparing non-magnetic undercoating layer.

2) Coating solution for preparing magnetic recording layer

| | |
|---|---|
| Ferromagnetic metal powder (Fe-Ni) (Fe:Ni = 96:4; coercive force (Hc): 1,600 Oe; specific surface area (BET): 57 m²/g; crystallite size: 200 angstroms; saturation magnetization (σs): 120 emu/g; grain size (mean diameter along the long axis): 0.12 μm; aspect ratio: 7.5; pH: 8.6; water soluble Na: 15 ppm; water soluble Ca: 10 ppm; water soluble Fe: 19 ppm) | 100 parts |
| Phenylphosphonic acid (for surface treatment) | 3 parts |
| Vinyl chloride copolymer (MR110, available from Nippon Zeon Co., Ltd.; polymerization degree: 350; content of —$SO_3Na$ group: $5 \times 10^{-6}$ mol/g; content of epoxy group: 3.5 wt. % in terms of monomer unit) | 10 parts |
| Polyurethane resin (—$SO_3Na$ group-containing polyester-polyurethane, content of —$SO_3Na$ group: $1 \times 10^{-4}$ mol/g, neopentylglycol/caprolactone polyol/MDI/0.9/2.6/1, weight ratio) | 2.5 parts |
| Polyisocyanate (Colonate L, available from Nippon Polyurethane Industries, Ltd.) | 2.5 parts |
| α-Alumina (particle size: 0.3 μm) | 10 parts |
| Chromium oxide ($Cr_2O_3$) | 1 part |
| Carbon black (particle size: 0.10 μm) | 3 parts |
| Butyl stearate | 1 part |
| Stearic acid | 2 parts |
| Oleic acid | 1 part |
| Methyl ethyl ketone | 150 parts |
| Cyclohexanone | 50 parts |
| Toluene | 40 parts |

All ingredients of the above-identified composition were kneaded in a continuous kneader and dispersed in a sand mill. The resulting dispersion was mixed with 3 parts of polyisocyanate (Colonate L) and 40 parts of butyl acetate. The mixture was passed through a filter having a mean pore size of 1 μm, to give a coating solution for magnetic recording layer.

3) Coating solution for preparing back-coating layer

| | |
|---|---|
| Carbon black I (BP-800, available from Cabot Corp., mean particle size: 17 μm) | 100 parts |
| Carbon black II (Thermal Black, available from Karnculb Corp., mean particle size: 270 mμ) | 10 parts |
| Non-magnetic powder I (calcium carbonate, available from Shiraishi Industries Co., Ltd., mean particle size: 40 mμ, Mohs' scale of hardness: 3.0) | 80 parts |
| Non-magnetic powder II (α-alumina, mean particle size: 200 mμ, Mohs' scale of hardness: 9) | 5 parts |
| Nitrocellulose | 140 parts |
| Polyurethane resin | 15 parts |
| Polyisocyanate | 40 parts |
| Polyester resin | 5 parts |
| Dispersant: | |
| copper oleate | 5 parts |
| copper phthalocyanine | 5 parts |
| barium sulfate | 5 parts |
| Methyl ethyl ketone | 2,200 parts |
| Butyl acetate | 300 parts |
| Toluene | 600 parts |

All ingredients of the above-identified composition were kneaded in a continuous kneader and dispersed in a sand mill. The resulting dispersion was passed through a filter having a mean pore size of 1 μm, to give a coating solution for back-coating layer.

4) Preparation of magnetic tape

On a continuous polyethylene naphthalate (PEN) web (support, Mictron, thickness: 5.3 µm, Young's modules in TD (width direction): 750 kg/mm²) was coated the above-mentioned coating solution for magnetic recording layer and the above-mentioned coating solution for non-magnetic undercoating layer by a simultaneous double coating method, to give a magnetic recording layer having a thickness of 0.7 µm (in terms of thickness after dryness) and a non-magnetic undercoating layer having a thickness of 1.0 µm (in terms of thickness after dryness).

The coated layers were treated successively with a cobalt magnet having a magnetic flux density of 3,000 gauss and a solenoid having a magnetic flux density of 1,500 gauss for orientation while the coated layers were still wet. Thus treated coated layers were dried to give a non-magnetic undercoating layer and a magnetic recording layer placed on the undercoating layer.

On the surface of the support opposite to the surface on which the non-magnetic undercoating layer and the magnetic recording layer were provided was coated the coating solution for back-coating layer to give a back-coating layer having a thickness of 0.5 µm (in terms of thickness after dryness). Thus, a continuous magnetic recording sheet was produced.

The continuous magnetic recording sheet was then subjected to calendaring (temperature 90° C., linear pressure 300 kg/cm) using a calendaring machine comprising seven metal rollers only. The calendered recording sheet was slit to give a magnetic recording tape having a width of 3.8 mm.

The magnetic recording tape was then encased in a DDS cartridge to give a data storage means. The back-coating layer had surface roughness values Ra (center line average roughness at cut-off 0.08 mm) 0.04 µm.

EXAMPLES 2 to 6

The procedures of Example 1 were repeated except for changing the preparation conditions so that the thickness of magnetic recording layer, the thickness of non-magnetic undercoating layer, the Young's modules (TD), the surface roughness of magnetic recording layer, or the inorganic powder in the back-coating layer was changed as set forth in Table 1, to give magnetic recording tapes. All of the resulting magnetic recording tapes have the same surface roughness of the back-coating layer as that of the back-coating layer of Example 1.

EXAMPLE 7

The procedures of Example 1 were repeated except for replacing the titanium dioixde (for the preparation of non-magnetic under-coating layer) with the following acicular α—Fe₂O₃, to give a magnetic recording tape. The resulting magnetic recording tape has the same surface roughness of the back-coating layer as that of the back-coating layer of Example 1.

Acicular α—Fe₂O₃ (particle size in the longitudinal axis direction: 0.20 µ, specific surface area (BET): 42 m²/g, crystallite size: 210 angstroms, aspect ratio: 7.5, pH: 6.0, Mohs' scale of hardness: 5.5, water soluble Na: 50 ppm, water soluble Ca: 10 ppm, water soluble Fe: 10 ppm)

Comparison Examples 1 to 8

The procedures of Example 1 were repeated except for changing the preparation conditions so that the thickness of magnetic recording layer, the thickness of non-magnetic undercoating layer, the Young's modules (TD), the surface roughness of magnetic recording layer, or the inorganic powder in the back-coating layer was changed as set forth in Table 1, to give magnetic recording tapes. All of the resulting magnetic recording tapes have the same surface roughness of the back-coating layer as that of the back-coating layer of Example 1.

TABLE 1

|  | Thickness (µm) | | | | Young's | Ra (nm) | Adhesion |
| --- | --- | --- | --- | --- | --- | --- | --- |
|  | Mag | Under | Back | Tape | modulus | (Mag) | (g) |
| Ex. 1 | 0.7 | 1.0 | 0.5 | 7.5 | 750 | 3.5 | 150 |
| Ex. 2 | 0.5 | 1.0 | 0.5 | 7.3 | 750 | 3.2 | 170 |
| Ex. 3 | 1.0 | 1.0 | 0.5 | 7.8 | 750 | 3.7 | 150 |
| Ex. 4 | 0.7 | 0.6 | 0.5 | 7.1 | 750 | 3.8 | 180 |
| Ex. 5 | 0.7 | 1.5 | 0.5 | 8.0 | 750 | 3.2 | 140 |
| Ex. 6 | 0.7 | 1.0 | 0.5 | 7.5 | 850 | 3.5 | 140 |
| Ex. 7 | 0.7 | 1.0 | 0.5 | 7.5 | 750 | 3.0 | 150 |
| Com. 1 | 1.7 | — | 0.5 | 7.5 | 750 | 4.5 | 100 |
| Com. 2 | 0.7 | — | 0.5 | 6.5 | 750 | 7.0 | 150 |
| Com. 3 | 0.3 | 1.0 | 0.5 | 7.1 | 750 | 2.8 | 190 |
| Com. 4 | 0.7 | 0.3 | 0.5 | 6.8 | 750 | 4.3 | 190 |
| Com. 5 | 0.7 | 2.5 | 0.5 | 9.0 | 750 | 3.0 | 40 |
| Com. 6 | 1.2 | 1.0 | 0.5 | 8.0 | 750 | 4.0 | 120 |
| Com. 7 | 0.7 | 1.0 | 0.5 | 7.5 | 650 | 3.5 | 160 |
| Com. 8 | 0.7 | 1.0 | 0.5* | 7.5 | 750 | 3.6 | 150 |

Remarks:
(1) Young's modulus (kg/mm²):
The sample [10 mm (width) × 100 mm (length)} was drawn at a rate of 10 mm/min. by means of a tensile tester. Young's modulus is expressed in terms of a stress at 1% elongation.
(2) Ra (nm) (Mag)
= Surface roughness (center line surface roughness) of magnetic recording layer
The "Ra" was determined by means of TOPO 3D (available from WYKO corporation) according to the known 3D-MIRAU method in the area of 250 µm × 250 µm.
(3) Adhesion (g)
= adhesion between the support and the under-coating layer (or the magnetic layer when only the magnetic layer is provided)

A mark-off line was given on the magnetic recording layer of a magnetic tape sample (width: 8 mm) in the width direction. The tape sample was fixed using a double-sided adhesive tape on a substrate under the condition that the magnetic recording layer faced the substrate. The fixed tape sample was bent at the mark-off line at 180° angle, and its free edge was drawn by means of a tensile tester. The force detected when the support was separated from the magnetic recording layer was recorded to give the adhesion.

[Evaluation of Magnetic Recording Tape]
(1) Measurements of Half Band Width ($W_{50}$) and Waveform Symmetric Property (γ)

A solitary reverse wave was recorded on and regenerated from a magnetic recording tape sample using a drum tester. From the regenerated wave from, the half band width ($W_{50}$) and the waveform symmetric property (γ) were measured. The measured data are expressed in relative values under the condition that the data measured on a semi-standard tape RSE 5001 (i.e., magnetic recording tape in which a magnetic recording layer is directly formed on a support) are expressed as 100%.

The waveform symmetric property (γ) is defined by the following equation:

$$(\gamma) = (W_2 - W_1)/W_{50}$$

$W_1$ and $W_2$ are the distances from the center line to the wave along the half band width line, as illustrated in the attached FIGURE.

Measurement

Head-Tape relative rate: 3.76 m/sec.

Head gap length: 0.3 μm (MIG head having a track width of 25 μm)

Solitary reverse wave: rectangular wave at f=250 kHz

Recording Current: Optimum recording current at 4 MHz for the semi-standard tape RSE 5001

(2) Regenerated Output (4 MHz output)

The measurement was performed using a tester 4500B (available from Medialogic Corp.). The measured data are expressed in terms of relative values under the condition that the output obtained when the 4 MHz signal is recorded on the D8 semi-standard tape RSE 5001 at the optimum recording current is made to 100%.

(3) Error Rate

Measurement was done in a D8 drive 8505XL (available from EXABYTE CORP.). The error rate was obtained by dividing the number of blocks in which the recorded random signals give ECC errors in the regeneration procedure by the total block number.

(4) Running Endurance

Measurement was done in a D8 drive 8505XL (available from EXABYTE CORP.). Random signals were recorded in the area of 100 blocks, and the regeneration procedure was repeated at 23° C,, 50% RH. The running endurance was evaluated by the times of repeated procedure (passes) when the system error is first observed.

TABLE 2

|        | Half band width ($W_{50}$) (%) | Waveform symmetry (%) | 4 Mz Regeneration output (5) | Error rate | Running endurance (times) |
|--------|---|---|---|---|---|
| Ex. 1  | 98  | 98  | 120 | $2.0 \times 10^{-5}$ | >5,000 |
| Ex. 2  | 97  | 96  | 123 | $2.2 \times 10^{-5}$ | >5,000 |
| Ex. 3  | 99  | 102 | 115 | $2.2 \times 10^{-5}$ | >5,000 |
| Ex. 4  | 99  | 98  | 117 | $2.5 \times 10^{-5}$ | >5,000 |
| Ex. 5  | 99  | 99  | 125 | $1.8 \times 10^{-5}$ | >5,000 |
| Ex. 6  | 99  | 126 | 126 | $1.5 \times 10^{-5}$ | >5,000 |
| Ex. 7  | 99  | 122 | 122 | $1.8 \times 10^{-5}$ | >5,000 |
| Com. 1 | 100 | 100 | 105 | $8.0 \times 10^{-5}$ | 3,000 |
| Com. 2 | 98  | 97  | 72  | $7.2 \times 10^{-4}$ | 2,000 |
| Com. 3 | 74  | 97  | 138 | $1.5 \times 10^{-4}$ | 4,000 |
| Com. 4 | 99  | 98  | 100 | $9.0 \times 10^{-5}$ | 3,800 |
| Com. 5 | 99  | 98  | 130 | $1.5 \times 10^{-5}$ | 2,500 |
| Com. 6 | 100 | 99  | 106 | $8.0 \times 10^{-5}$ | 4,700 |
| Com. 7 | 99  | 97  | 107 | $7.0 \times 10^{-5}$ | 3,000 |
| Com. 8 | 99  | 98  | 120 | $2.0 \times 10^{-5}$ | 1,500 |

The results set forth in Table 2 indicate that the magnetic recording tapes of Examples 1 to 7 (which embody the present invention) are favorably employable in the representative conventional computer data recording system, and gives a high output and a low error rate, and further shows satisfactory running endurance.

The magnetic recording tape of Comparison Example 1 has a structure (i.e., conventional type of magnetic recording layer formed directly on the support) similar to the standard tape. The recording tape of Com. Example 1 gives a low output and a high error rate. The recording tape of this type shows poor running endurance. The recording tape of Comparison Example 2 which has an extremely thin magnetic recording layer directly on the support gives a lower output of an increased error rate, and further shows poorer running endurance.

Comparison Example 3 represents a magnetic recording tape in which an extremely thin magnetic recording layer is formed on the support via a non-magnetic under-coating layer. In this case, a high output is obtained, but the obtained solitary regenerated reverse waveform does not fit the conventional computer data storage system and hence the error rate is high. Moreover, the running endurance is poor.

Comparison Example 4 represents a magnetic recording tape in which a thin magnetic recording layer is formed on the support via an extremely thin non-magnetic under-coating layer. In this case, the error rate is high, and the running endurance is poor. Comparison Example 5 represents a magnetic recording tape in which a thin magnetic recording layer is formed on the support via a extremely thick non-magnetic under-coating layer. In this case, a high output is obtained. However, the adhesion of the non-magnetic layer to the support becomes poor, and therefore the running endurance becomes extremely poor.

Comparison Example 6 represents a magnetic recording tape in which a thick magnetic recording layer is formed on the support via a non-magnetic under-coating layer. In this case, the error rate is high, and the running endurance is poor.

Comparison Example 7 represents a magnetic recording tape in which a thick magnetic recording layer is formed on the support having a low Young's modulus in the width direction, via a non-magnetic under-coating layer. In this case, the output is low and the error rate is high because smooth contact between the recording tape and a magnetic head is not attained, and the running endurance is poor.

The magnetic recording tape of Comparison Example 8 has a back-coating layer containing no inorganic powder. In this case, the running endurance is extremely poor.

What is claimed is:

1. A magnetic recording tape comprising a flexible polymer web, a magnetic recording layer which comprises a ferromagnetic powder and a binder and is arranged on one surface side of the web via a non-magnetic undercoating layer comprising a binder and a non-magnetic powder, and a back-coating layer which is arranged on another surface side of the web, wherein the magnetic recording tape has a thickness of not more than 8 μm;

the non-magnetic undercoating layer has a thickness of 0.5 to 2.0 μm;

the magnetic recording layer has a thickness of 0.5 to 1.0 μm;

the flexible polymer web has a Young's modules of not lower than 700 kg/mm² in its width direction; and the back-coating layer comprises a binder polymer, a carbon black and an inorganic material powder.

2. The magnetic recording tape of claim 1, wherein the magnetic recording layer has been formed on the non-magnetic undercoating layer under the condition that the non-magnetic undercoating layer is wet.

3. The magnetic recording tape of claim 1, wherein the carbon black comprises a carbon black I having a mean particle size of 10 to 20 mμ and a carbon black II having a mean particle size of 230 to 300 mμ.

4. The magnetic recording tape of claim 1, wherein the inorganic material powder comprises an inorganic material powder I having a mean particle size of 30 to 50 mμ and Mohs' scale of hardness of 3 to 4.5 and an inorganic material powder II having a mean particle size of 80 to 250 mμ and Mohs' scale of hardness of 5 to 9.

5. The magnetic recording tape of claim 1, wherein the inorganic material powder comprises a calcium carbonate powder having a mean particle size of 30 to 50 mμ in combination with an inorganic material powder having a mean particle size of 80 to 250 mμ and Mohs' scale of hardness of 5 to 9.

6. The magnetic recording tape of claim 1, wherein the inorganic material powder comprises an inorganic metal powder having a mean particle size of 30 to 50 mµ and Mohs' scale of hardness of 3 to 4.5 in combination with a powder of α-iron oxide or α-alumina having a mean particle size of 80 to 250 mµ.

7. The magnetic recording tape of claim 1, wherein the flexible support web has a thickness of 1.0 to 6.5 µm.

8. The magnetic recording tape of claim 1, wherein the magnetic recording layer has a surface roughness of 2 to 5 nm, said surface roughness being determined by 3D-MIRAU method.

9. The magnetic recording tape of claim 1, wherein the magnetic recording tape has a thickness of 3.0 to 7.8 µm.

10. The magnetic recording tape of claim 1, wherein the flexible support web has a Young's modules of 730 to 1,700 kg/mm$^2$ in its width direction.

11. The magnetic recording tape of claim 3, wherein the carbon black I and the carbon black II are in a weight ratio of 95:5 to 85:15 and are contained in the back-coating layer in a total amount of 45 to 65 weight parts per 100 weight parts of the binder polymer.

12. The magnetic recording tape of claim 4, wherein the inorganic material powder I and the inorganic material powder II are in amounts of 35 to 100 weight parts and 3 to 20 weight parts, respectively, per 100 weight parts of the carbon black, and the inorganic material powder I and the inorganic material powder II are in a weight ratio of 90:10 to 70:30.

13. The magnetic recording tape of claim 1, wherein the back-coating layer further contains a lubricant selected from the group consisting of a fatty acid and a fatty acid ester.

14. The magnetic recording tape of claim 13, wherein the lubricant is contained in the back-coating layer in an amount of 1 to 5 weight parts per 100 weight parts of the binder polymer.

15. The magnetic recording tape of claim 1, wherein the back-coating layer has a surface roughness of 3 to 60 nm.

16. The magnetic recording tape of claim 1, wherein the non-magnetic powder is titanium dioxide or α-iron oxide.

17. The magnetic recording tape of claim 1, wherein the non-magnetic powder is titanium dioxide or α-iron oxide, and the non-magnetic undercoating layer further contains a carbon black.

18. The magnetic recording tape of claim 17, wherein the carbon black has a particle size of 10 to 35 µm, and is contained in the non-magnetic undercoating layer in an amount of 3 to 20 weight parts per 100 weight parts of the non-magnetic powder.

19. The magnetic recording tape of claim 1, wherein the non-magnetic undercoating layer further contains a lubricant selected from the group consisting of a fatty acid and a fatty acid ester.

20. The magnetic recording tape of claim 1, wherein the thickness of the magnetic recording layer and that of non-magnetic undercoating layer are in a ratio of 1:1.2 to 1:4.

21. The magnetic recording tape of claim 1, wherein the ferromagnetic powder is a ferromagnetic metal powder.

22. The magnetic recording tape of claim 21, wherein the ferromagnetic metal powder has a specific surface area of 30 to 70 m$^2$/g, a crystallite size of 50 to 300 angstroms, a saturation magnetization of 120 to 170 emu/g, and a coercive force of 1,900 to 2,600 Oe.

23. The magnetic recording tape of claim 1, wherein the binder of the magnetic recording layer comprises a combination of a polyurethane resin, a vinyl chloride resin and a polyisocyanate.

24. The magnetic recording tape of claim 23, wherein the polyurethane resin, the vinyl chloride resin and the polyisocyanate are in amounts of 2 to 50 weight parts, 5 to 70 weight parts and 2 to 50 weight parts, respectively, to give 100 weight parts of the binder.

25. The magnetic recording tape of claim 1, wherein the magnetic recording layer further contains a carbon black having a particle size of 5 to 350 mµ.

* * * * *